United States Patent

Van Den Heuvel et al.

[15] 3,661,584

[45] May 9, 1972

[54] PROTEINACEOUS COLLOID COMPOSITIONS PROVIDED ON GLASS SUPPORTS

[72] Inventors: Walter August Van Den Heuvel, Berchem; Jozef Frans Willems, Wilrijk; Herman Adelbert Philippaerts, Mortsel; Roland Francois Beels, Linkebeek; Renaat Frans Heylen, Deurne, all of Belgium

[73] Assignee: Gevaert-Agfa N.V., Mortsel, Belgium

[22] Filed: Nov. 10, 1969

[21] Appl. No.: 875,570

[30] Foreign Application Priority Data

Nov. 18, 1968 Great Britain.....................54,678/68

[52] U.S. Cl..................................96/67, 117/81, 117/88, 117/124
[51] Int. Cl...........................................G03c 1/76
[58] Field of Search............117/88, 81, 73, 124 A, 124 D, 117/124 E, 124 F; 96/67, 114.4, 114.7

[56] References Cited

UNITED STATES PATENTS

| 2,946,701 | 7/1960 | Plueddemann | 117/124 |
| 3,072,482 | 1/1963 | Beeber | 96/75 |
| 3,186,965 | 6/1965 | Plueddemann | 117/124 |
| 3,438,801 | 4/1969 | Schlientz | 117/88 |
| 3,453,136 | 7/1969 | Bylsma | 117/124 |
| 3,461,027 | 8/1969 | Plueddemann | 117/124 |

FOREIGN PATENTS OR APPLICATIONS 821,251   10/1959   Great Britain

*Primary Examiner*—Norman G. Torchin
*Assistant Examiner*—J. R. Hightower
*Attorney*—Alfred W. Breiner

[57] ABSTRACT

A photographic element comprising a glass support and a photosensitive emulsion layer on said support comprising a film-forming proteinaceous colloid is described. The adherence of the emulsion layer to the glass support is enhanced by including the emulsion layer an organic silicon compound having hydrocarbon groups directly or indirectly attached to a silicon atom wherein at least one of the hydrocarbon groups carries a group or atom which has chemical affinity for the free reactive groups of the proteinaceous colloid or which can be cross-linked to the free reactive groups through the intermediary of a cross-linking agent. The adherence of the photosensitive emulsion layer to the glass support is enhanced without affecting the photosensitive properties of the emulsion layer.

20 Claims, No Drawings

PROTEINACEOUS COLLOID COMPOSITIONS PROVIDED ON GLASS SUPPORTS

The present invention relates to methods for promoting the adhesion to glass of proteinaceous colloid compositions, especially gelatin compositions and in particular photographic gelatino silver halide emulsions, by means of organic silicon compounds, and to proteinaceous colloid compositions comprising said organic silicon compounds.

Photographic light-sensitive materials having glass supports are well known. These materials are used for general photographic purposes, in the graphic arts and for scientific purposes, e.g. for microphotography, astrophotography, holography, for recording nucleophysical phenomenons, for the preparation of masks for use in the production of microelectronic integrated circuits, etc.

When in the preparation of such like photographic plate materials the gelatino silver halide emulsion layer is directly provided on the glass support, the said emulsion layer shows a poor adhesion to the glass support so that during processing the emulsion layer easily comes loose from the glass support and in addition thereto, is easily subject to mechanical damage.

Therefore, it is highly desirable to improve the adhesion of the said emulsion layers to the glass supports, the more because when strongly anchored to the support, the said emulsions lend themselves perfectly to classical hardening e.g. by means of formaldehyde whereby the said emulsions become highly resistant to abrasion and other mechanical damaging.

In the manufacture of photographic material for use in silver halide emulsion systems it is common practice to apply to the support, before the light-sensitive silver halide emulsion layer is applied, a thin subbing layer mainly consisting of gelatin and comprising inorganic compounds such as colloidal silicon dioxide or chrome alum in order to improve the adhesion of the said emulsion layer to the glass support.

The provision of such a subbing layer in photographic plate materials might give in some instances satisfactory results as regards the adhesion. However, this adhesion is still insufficient to make the emulsion layers or colloid layers highly resistant to abrasion by enhancing the hardening in a classical way e.g. by means of formaldehyde which is especially important for making holographic plate materials and photographic high resolution plates for the preparation of masks for use in the production of microelectronic integrated circuits.

It has now been found that a strong adhesion to glass of proteinaceous colloid compositions, especially gelatin colloid compositions and in particular gelatino silver halide emulsions can be effected by the use of organic silicon compounds, comprising hydrocarbon groups, which are directly or indirectly e.g. by oxygen, attached to a silicon atom, wherein at least one of said hydrocarbon groups carries a group or atom that has a chemical affinity for proteinaceous colloids, more particularly for the free reactive groups such as amino groups of the said proteinaceous colloids, or that can be cross-linked to the said free reactive groups through the intermediary of a cross-linking agent, more particularly a hardening agent commonly used for hardening proteinaceous colloids.

The groups having a chemical affinity for proteinaceous colloids determine the effectiveness of the said organic silicon compounds and include among others acid anhydride groups, groups having an active halogen atom, acid ester groups such as methoxycarbonyl, aldehyde groups, ketone groups, groups with activated double bond e.g. methacryloyl, isocyanate groups, masked isocyanate groups, epoxy groups etc. Compounds containing as reactive groups epoxy groups are particularly useful.

Among the groups by means of which the silicon compounds can be cross-linked with the proteinaceous colloid material through the intermediary of a cross-linking agent, more particularly a hardening agent, primary and secondary amino groups can be particularly mentioned.

The compounds of use according to the present invention are thus organic silicon compounds comprising a silicon portion having an affinity for glass and an organic portion that is tailored to match the reactivity of the proteinaceous colloid, so that a stable bond between the glass surface and the surface of the proteinaceous colloid layer applied thereto can be realized.

Representative examples of silicon compounds particularly suitable for use according to the present invention are those corresponding to the following non-limitative general formula:

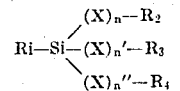

wherein:
X stands for oxygen or —O—CO—,
each of $R_1$, $R_2$, $R_3$ and $R_4$ (the same or different) stands for a hydrocarbon group such as alkyl and aryl including a substituted hydrocarbon, at least one of said hydrocarbon groups comprising a group or atom that has a chemical affinity for proteinaceous colloids, more particularly for the free reactive groups such as amino groups of the said proteinaceous colloids, or that can be cross-linked to the said free reactive groups through the intermediary of a cross-linking agent, more particularly a hardening agent commonly used for hardening proteinaceous colloids, and each of $n$, $n'$ and $n''$ (the same or different) stands for 0 or 1, $n + n' + n''$ being at least equal to 1, and when $n + n' + n'' = 1$, $R_1$ being a hydrocarbon group comprising a said group or atom having a chemical affinity for proteinaceous colloids or that can be cross-linked to the free reactive groups of the said proteinaceous colloids through the intermediary of a cross-linking agent.

The following compounds are representative examples of organic silicon compounds suitable for use according to the present invention:

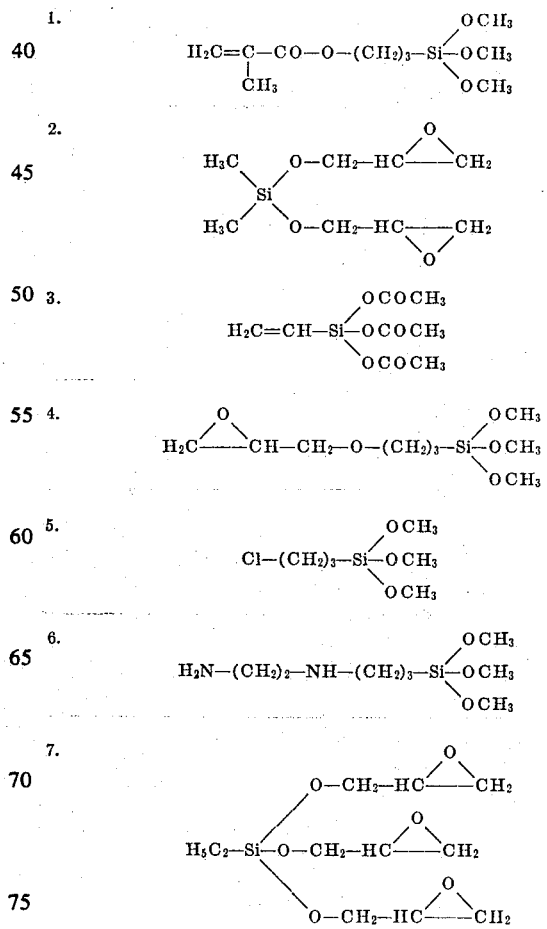

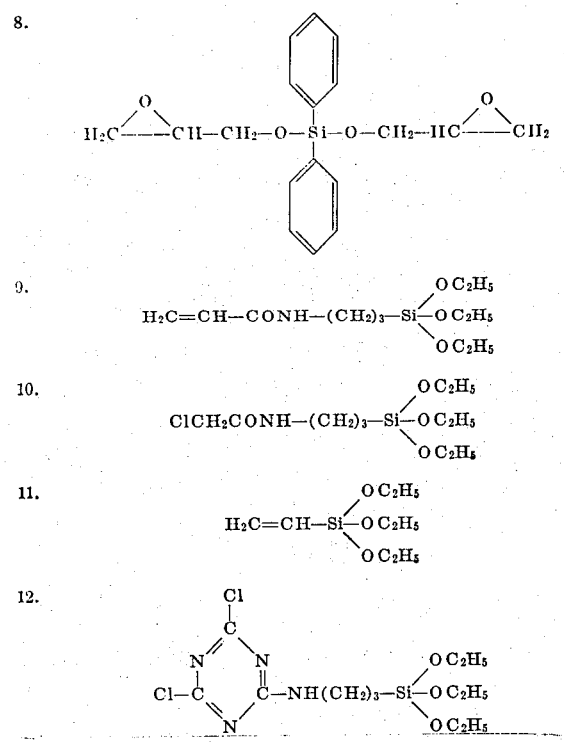

Compounds 1, 3, 4, 5 and 6 are marketed by the Dow Corning Corp., Michigan, USA under the trade-names Dow Corning Z–6030 silane, Z–6075 silane, Z–6040 silane, Z–8–0999 silane and Z–6020 silane respectively.

Compound 11, vinyl triethoxy silane is commercially available from Pierce Chemical Comp., Rockford, Ill., USA.

The other compounds can be prepared as follows.

COMPOUND 2

A solution of 30.3 g (0.3 mole) of triethylamine in 50 ccs of anhydrous dioxan was added at room temperature to a solution of 22.2 g (0.3 mole) of 2,3-epoxypropanol in 200 ccs of anhydrous dioxan. A solution of 19.3 g (0.15 mole) of dichloro-dimethylsilane in 150 ccs of anhydrous dioxan was then added dropwise in 30 minutes. Triethylammonium chloride precipitated immediately and after having been kept at room temperature for 2 days the mixture was filtered with suction. The dioxan solution was concentrated by evaporation and the remaining oil was distilled in vacuo on a water bath. Boiling point : 84° C/0.5 mm Hg.

COMPOUND 7

This compound was prepared in an analogous way as compound 2 with the difference, however, that 16.3 g (0.1 mole) of trichloro-monoethylsilane were used instead of 19.3 g (0.15 mole) of dichlorodimethylsilane. Boiling point : 138° C/0.5 mm Hg.

COMPOUND 8

This compound was prepared in an analogous way as compound 2 with the difference, however, that 29.4 g (0.4 mole) of 2,3-epoxypropanol were used instead of 22.2 g (0.3 mole), 40.4 g (0.4 mole) of triethylamine were used instead of 30.3 g (0.3 mole) and 50.6 g (0.2 mole) of dichloro-diphenylsilane were used instead of 19.3 g (0.15 mole) of dichloro-dimethylsilane. Boiling point : 184° C/0.4 mm Hg.

COMPOUND 9

To a solution of 66.3 g of aminopropyl triethoxy silane in 200 ccs of ether, a solution of 13.6 g of acryloyl chloride in 100 ccs of ether was added dropwise at 0° C. The white precipitate of aminopropyl triethoxy silane hydrochloride formed was filtered off by suction whereupon the ether filtrate was concentrated by evaporation and the residue was distilled. Boiling Point : 137° C/0.7 mm Hg.

COMPOUND 10

To a solution of 17 g of chloroacetyl chloride in 150 ccs of ether, a solution of 66.3 g of aminopropyl triethoxy silane in 200 ccs of ether was added dropwise at −10° C. The mixture was stirred for 3 hours at −10° C whereupon the white precipitate of aminopropyl triethoxy silane hydrochloride was filtered off by suction. The ether filtrate was concentrated by evaporation and the residue was distilled. Boiling point : 138° C/0.4 mm Hg.

COMPOUND 12

To a solution of 27 g of cyanogenchloride in 200 ccs of dioxan, a solution of 33 g of aminopropyl triethoxy silane and 15.1 g of triethylamine in 200 ccs of dioxan was added dropwise in 45 minutes at 10° C. The suspension was stirred at room temperature for 4 hours and the triethylamine hydrochloride formed was filtered off by suction. The dioxan solution was then concentrated by evaporation.

Although the organic silicon compounds of use according to the present invention are mainly intended for promoting adhesion to glass of coating compositions comprising gelatin as proteinaceous colloid, for instance photographic gelatin compositions forming one of the water-permeable colloid layers of a photographic light-sensitive material, dyed gelatin layers for filter purposes, etc., they can also be used for promoting the adhesion to glass of coating compositions comprising other proteinaceous colloidal materials such as glue, albumin, casein, and zein and mixtures thereof with gelatin. Moreover, the said proteinaceous colloid composition may also comprise in addition to the proteinaceous material such as gelatin other film-forming natural or modified natural hydrophilic colloids as, e.g. hydroxyethyl cellulose, carboxymethyl cellulose, methyl cellulose, carboxymethyl hydroxyethyl cellulose, gum arabic, sodium alginate and hydrophilic derivatives of such colloids as well as synthetic hydrophilic polymers as e.g. polyvinyl alcohol and poly-N-vinylpyrrolidone.

Thus, in its broadest aspect the present invention is concerned with a method of promoting adhesion to glass surfaces of film-forming proteinaceous colloid compositions which method comprises coating the said colloid compositions on the said glass surfaces in the presence of organic silicon compounds as described above.

However, the invention is especially concerned with the direct adhesion to glass supports of photographic gelatino silver halide emulsions. Indeed, it was found that by means of the above organic silicon compounds the use of subbing layers for promoting the adhesion to glass of photographic gelatino silver halide emulsion layers can be dispensed with, so that photographic plate materials cen be provided having silver halide emulsion layers directly coated on glass supports. The omission of a subbing layer is not only advantageous from the standpoint of manufacturing the material, but also poses optical advantages. Moreover, the emulsion layers, anchored directly to the glass support in accordance with the method of the present invention, can be successfully hardened to improve their resistance to mechanical damage or scratching without giving rise to a reduction of the adhesion of the layers to the support so that the layers do not tend to come loose from the glass support on storing or processing. This makes the method of the invention of particular value for promoting the adhesion to glass of such delicate emulsions as are the Lippmann emulsions i.e. silver halide emulsions the average grain size of which is at most 0.1 micron, of use for scientific purposes, especially the high resolution Lippmann emulsions having a thickness generally comprised between 3 and 8 microns, for the preparation of photographic plates employed to make masks for use in the production of microelectronic integrated circuits. Though these emulsions, as is known, are of a very delicate nature, the above organic silicon compounds were found to have no disadvantageous effect on the sensitometric characteristics of these emulsions. On the contrary, it was found that these silicon compounds make the emulsion layer absorb less processing solution this being without affect on the speed of the photographic material.

For the preparation of masks in the production of microelectronic integrated circuits drawings are made on highly enlarged scale of the various successive masks necessary to produce one integrated circuit whereupon the drawings are reduced, if necessary in successive steps, and reproduced on a photographic plate material forming thereby the mask ready for use. By various photographic and chemical steps (photo-etching of lacquered plates) the images of the masks thus produced are transferred to the surface on which the integrated circuit is to be made, in order to produce the required circuit elements. It is evident that these plate materials should have a high resistance to damage or scratching and that the emulsions of these materials should be strongly anchored to the glass supports.

Adhesion to glass of proteinaceous colloid compositions, and especially gelatino silver halide emulsions, can be effected in accordance with the present invention by treating the glass surface, prior to coating of the said colloid compositions, with the said organic silicon compounds, e.g. by applying a solution of the said organic silicon compound in an appropriate solvent such as water, lower alcohols, acetone, etc. to the glass surface.

However, according to a preferred embodiment of the method of the invention, successful adhesion of film-forming proteinaceous colloid compositions, in particular gelatino silver halide emulsions, to glass supports is realized by incorporating the said organic silicon compounds, e.g. from a solution in an appropriate solvent, into the said film-forming proteinaceous composition itself.

Therefore, the present invention also provides film-forming coating compositions which comprise in addition to the proteinaceous colloid an organic silicon compound as described above as well as materials comprising glass supports onto which such film-forming coating compositions have been coated.

The invention provides in particular light-sensitive gelatino silver halide emulsions, especially silver halide emulsions of the Lippmann type, comprising organic silicon compounds as described above as well as photographic plate materials comprising directly coated on glass supports gelatino silver halide emulsion layers comprising organic silicon compounds as described above.

Of course it is also possible to promote adhesion of a gelatino silver halide emulsion to a glass support using the organic silicon compounds of the invention by applying the said silicon compounds to the glass surface, prior to coating of the said gelatino silver halide emulsion, from a composition comprising a hydrophilic film-forming colloid binder which may be a proteinaceous colloid such as gelatin or not, forming thereby a hydrophilic colloid layer serving as subbing layer for the gelatino silver halide emulsion.

Though as described above the method of the invention is of particular value for promoting the adhesion to glass of such delicate emulsions as are the Lippmann emulsions of use for scientific purposes, it is of course also suitable for promoting adhesion to glass of all kinds of other photographic silver halide emulsions either directly without subbing layer or indirectly using a subbing layer comprising a said organic silicon compound.

Light-sensitive silver halide emulsions to be coated either directly or indirectly on glass in the presence of the above silicon compounds may comprise as light-sensitive silver halide : silver bromide, silver chloride or silver iodide as well as mixtures thereof. These emulsions may be non-optically sensitized emulsions as well as orthochromatic and panchromatic emulsions.

The gelatin silver halide emulsion may comprise in addition to the silver halide other addenda commonly employed such as sensitizing dyes, hardeners, such as formaldehyde, chrome alum, etc., stabilizers, pH-adjusting compounds, color couplers, antifoggants, development accelerators, thickening agents, developing agents, softening agents or the like.

The glass supports onto which the proteinaceous colloid compositions, more particularly gelatino silver halide emulsions, are coated according to the present invention, are preferably subjected to a pretreatment particularly in order to degrease the glass surface and thus to improve the hydrophility thereof. A great many methods can be used for chemically cleansing glass surfaces and in this connection there can be referred to L. Holland, "The Properties of Glass Surfaces" Chapman & Hall, London 1964, Chapter 5, p. 290–347.

The amount of organic silicon compounds of use in accordance with the present invention necessary to obtain sufficient adhesion of the proteinaceous colloid composition to the glass support can vary within very wide limits and depends on the particular silicon compound employed and on the proteinaceous colloid material involved. In general, the said organic silicon compounds are used in amounts comprised between 1 mg and 100 mg, preferably from 5 to 20 mg, per gram of dry poteinaceous colloid.

The following examples illustrate the present invention.

EXAMPLE 1

A gelatin composition comprising per 100 ml : 2.8 g of gelatin, 6 mg of formaldehyde and 25 mg of compound 4, which was added from a 5 percent solution in methanol, was coated on a glass plate in such a way that 3 ml of gelatin composition covered 108 sq.cm.

The gelatin coating was gelled at 2° C whereupon it was dried in an air current of 35° C.

In order to examine the adhesion of the gelatin coating to the glass support and its abrasion resistance in swollen (wet) state the plate material was dipped for 30 min. in water of 20° C.

The adhesion was determined by scratching the wet material with a pointed member and then examining the trace of the scratch.

The value given hereinafter for the abrasion resistance is the pressure (in gram) necessary to be applied to a steel ball having a diameter of one-fourth inch to make it penetrate completely through the wet gelatin coating, on which the ball is placed, when the ball is drawn over the material.

The above gelatin coating showed an excellent adhesion to the glass support in that the width of the scratch formed by the pointed member remained the same over the entire trace.

The excellent adhesion of the gelatin layer to the glass support remains upon storing of the material. This was proved by determining the adhesion as described above of a similar gelatin coating applied to a glass support after having subjected it to an accelerated storing test by keeping it for 36 hours in an atmosphere of 57° C and 34 percent relative humidity.

The abrasion resistance of the above gelatin coating was also very good. After having been stored for 36 hours at 57° C and 34 percent relative humidity the resistance to abrasion was 800–1,000 (= pressure in gram to be applied to the ball).

A gelatin layer comprising no compound 4 had such a poor adhesive power towards the glass support than when scratching the gelatin layer with the pointed member as described above it comes completely loose from the support. A gelatin layer comprising no hardening agent and no compound 4 had an abrasion resistance of only 100.

EXAMPLE 2

A conventional gelatino silver halide emulsion comprising per 100 ml : 2.8 g of gelatin, 6 mg of formaldehyde, 25 mg of compound 4, which was added from a 5 percent solution in methanol, and an amount of silver halide equivalent to 1.4 g of silver, was coated on a glass plate in such a way that 3 ml of emulsion covered 108 sq.cm.

The emulsion was gelled at 2° C whereupon it was dried in an air current of 35° C.

Plate materials formed in the above way showed an excellent adhesion of the emulsion to the glass support and an excellent abrasion resistance when subjected to tests as described in Example 1. When the materials were subjected to an accelerated storing test by keeping the materials for 36 hours in an atmosphere of 57° C and 34 percent relative humidity, the abrasion resistance and adhesion remained excellent.

EXAMPLE 3

A silver bromide emulsion comprising per kilogram 72 g of silver bromide and 93 g of gelatin was prepared by simultaneous addition of a silver nitrate solution and a potassium bromide solution to a 3 percent aqueous solution of gelatin. The conditions of precipitation were adjusted so that a Lippmann emulsion with an average grain size of 0.07 micron was obtained. Details as to the preparation of Lippmann emulsions can be found among others in P.Glafkides "Photographic Chemistry," Vol. 1, 1958, Fountain Press, London.

The emulsion comprised as hardening agent formaldehyde and as spectral sensitizer the merocyanine dye having the following structural formula :

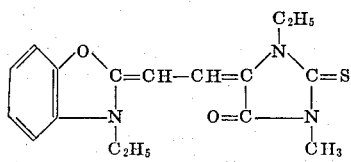

by means of which a strong spectral sensitization in the region of 520–550 nm was obtained.

To the emulsion was added 5 ml of a 5 percent solution in methanol of compound 4.

The emulsion was coated on a glass plate pro rata of 230 ml per sq.m so as to obtain after drying a layer thickness of 6 microns.

The photographic plate material thus formed, which is suitable for microelectronics mask-making, showed an excellent adhesion of the emulsion to the glass support and an excellent abrasion resistance when subjected to tests as described in Example 1. When the materials were subjected to an accelerated storing test by keeping the materials for 36 hours in an atmosphere of 57° C and 34 percent relative humidity, the abrasion resistance and adhesion remained excellent.

EXAMPLES 4 and 5

Examples 1 and 2 were repeated using however compound 9 instead of compound 4. The materials showed a very good adhesion and the abrasion resistance, determined as described in Example 1 after having stored the materials for 36 hours in an atmosphere of 57° C and 34 percent relative humidity, was comprised between 600 and 800.

EXAMPLE 6

Example 1 was repeated using, however, compound 2 instead of compound 4. The gelatin coating showed a good adhesion to the glass support and the abrasion resistance determined as described in Example 1 after having stored the material for 36 hours in an atmosphere of 57° C and 34 percent relative humidity was comprised between 600 and 700.

EXAMPLE 7

Example 2 was repeated using however compound 11 instead of compound 4. In this case the silicon compound was added to the emulsion from a 5 percent soltuion in acetone. The emulsion layer showed a very good adhesion to the glass support and the abrasion resistance, determined as described in Example 1 after having stored the material for 36 hours in an atmosphere of 57° C and 34 percent relative humidity was 600.

EXAMPLE 8

Example 1 was repeated with the difference, however, that now compound 6 was used instead of compound 4.

The gelatin layer shows a very good adhesion to the support and the abrasion resistance, determined as described in Example 1 after having stored the material for 36 hours in an atmosphere of 57° C and 34 percent relative humidity was comprised between 550 and 700.

EXAMPLE 9

A glass plate with a surface of 108 sq.cm was immersed for 15 min. in a 0.01 percent aqueous solution of compound 4 formed by diluting with water a 5 percent solution of the said compound in methanol. Thereupon the glass plate was rinsed and dried.

Then 3 ml of a gelatin composition as described in Example 1 but comprising no compound 4 was applied to the glass surface.

The gelatin layer formed showed a very good adhesion and abrasion resistance. The abrasion resistance determined as described in Example 1 after having stored the material for 36 hours at 57° C and 34 percent relative humidity was comprised between 800 and 1,000.

EXAMPLE 10

Example 9 was repeated with the difference however, that now a gelatino silver halide emulsion as described in Example 2 but comprising no compound 4 was coated on the glass support.

A very good adhesion and abrasion resistance was obtained.

We claim :

1. Method of adhering a photosensitive film-forming proteinaceous colloid emulsion to glass surfaces which method comprises coating the said emulsion on the said glass surfaces in the presence of an organic silicon compound comprising hydrocarbon groups directly or indirectly attached to a silicon atom wherein at least one of said hydrocarbon groups carries a group or atom that has a chemical affinity for the free reactive groups of the said proteinaceous colloid or that can be cross-linked to the said free reactive groups through the intermediary of a cross-linking agent.

2. Method according to claim 1, wherein the said organic silicon compound corresponds to the following formula :

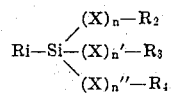

wherein :

X stands for oxygen or —O—CO—, each of $R_1$, $R_2$, $R_3$ and $R_4$ (the same or different) stands for a hydrocarbon group at least one of said hydrocarbon groups comprising a group or atom that has a chemical affinity for the free reactive groups of the said proteinaceous colloid or that can be cross-linked to the said free reactive groups through the intermediary of a cross-linking agent, and each of $n$, $n'$ and $n''$, the same or different, stands for 0 or 1, $n + n' + n''$ being at least equal to 1 and when $n + n' + n'' = 1$, $R_1$ being a hydrocarbon group comprising a said group or atom that has a chemical affinity for the free reactive groups of the said proteinaceous colloid or that can be cross-linked to the said free reactive groups through the intermediary of a cross-linking agent.

3. Method according to claim 2, wherein $n + n' + n'' = 3$, each of $R_2$, $R_3$ and $R_4$ stands for an alkyl group and $R_1$ stands for an alkyl group comprising a said group or atom that has a chemical affinity for the free reactive groups of the said proteinaceous colloid or that can be cross-linked to the said free reactive groups through the intermediary of a cross-linking agent.

4. Method according to claim 1, wherein the said group or atom having a chemical affinity for the free reactive groups of the proteinaceous colloid is a member selected from acid anhydride groups, groups comprising an active halogen atom, acid ester groups, aldehyde groups, ketone groups, groups with activated double bond, isocyanate groups, masked isocyanate groups and epoxy groups.

5. Method according to claim 1, wherein the said group that can be cross-linked to the free reactive groups of the proteinaceous colloid through the intermediary of a cross-linking agent is a primary or secondary amine group.

6. Method according to claim 1, wherein the said organic silicon compound is present in the said proteinaceous colloid emulsion.

7. Method according to claim 1, which comprises the steps of first treating the glass surface with a solution of the said organic silicon compound and then coating the said colloid emulsion on the glass surface treated.

8. Method according to claim 1, which comprises the steps of applying to the glass surface a composition comprising a hydrophilic film-forming colloid binder and a said organic silicon compound and coating thereover the said proteinaceous colloid emulsion.

9. Method according to claim 1, wherein the said proteinaceous colloid is gelatin.

10. Method according to claim 1, wherein the said proteinaceous colloid emulsion is a gelatino silver halide emulsion.

11. Method according to claim 10, wherein said silver halide emulsion is a silver halide emulsion of the Lippmann type.

12. Method according to claim 1, wherein the said organic silicon compound is used in an amount comprised between 1 mg and 100 mg per gram of dry proteinaceous colloid of the proteinaceous colloid emulsion.

13. A photographic element comprising a glass support and a photosensitive emulsion layer on said support comprising a film-forming proteinaceous colloid and an organic silicon compound having hydrocarbon groups directly or indirectly attached to a silicon atom wherein at least one of said hydrocarbon groups carries a group or atom that has a chemical affinity for the free reactive groups of the said proteinaceous colloid or that can be cross-linked to the said free reactive groups through the intermediary of a cross-linking agent.

14. A photographic element according to claim 13 wherein said silicon compound corresponds to the following formula:

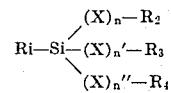

wherein:

X stands for oxygen or —O—CO—, each of $R_1$, $R_2$, $R_3$ and $R_4$ (the same or different) stands for a hydrocarbon group at least one of said hydrocarbon groups comprising a group or atom that has a chemical affinity for the free reactive groups of the said proteinaceous colloid or that can be cross-linked to the said free reactive groups through the intermediary of a cross-linking agent, and each of $n$, $n'$ and $n''$, the same or different, stands for 0 or 1, $n+n'+n''$ being at least equal to 1 and when $n+n'+n'' = 1$, $R_1$ being a hydrocarbon group comprising a said group or atom that has a chemical affinity for the free reactive groups of the said proteinaceous colloid or that can be cross-linked to the said free reactive groups through the intermediary of a cross-linking agent.

15. A photographic element according to claim 13, wherein the said proteinaceous colloid is gelatin.

16. A photographic element according to claim 13, wherein the said photosensitive emulsion layer is a gelatino silver halide emulsion layer.

17. A photographic element according to claim 16, wherein the said gelatino silver halide emulsion layer is a silver halide emulsion layer of the Lippmann-type.

18. A photographic element according to claim 13, wherein said emulsion layer also comprises a hardening agent for said proteinaceous colloid.

19. A photographic element according to claim 18, wherein said hardening agent is formaldehyde.

20. A photographic element according to claim 13, wherein the said organic silicon compound is present in an amount of 1 mg to 100 mg per gram of dry proteinaceous colloid.

* * * * *